United States Patent
Kwon

(10) Patent No.: US 11,479,202 B2
(45) Date of Patent: Oct. 25, 2022

(54) SEAT AIRBAG FOR VEHICLE

(71) Applicants: Hyundai Motor Company, Seoul (KR); Kia Motors Corporation, Seoul (KR)

(72) Inventor: Hyock In Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 92 days.

(21) Appl. No.: 16/996,531

(22) Filed: Aug. 18, 2020

(65) Prior Publication Data

US 2021/0291778 A1    Sep. 23, 2021

(30) Foreign Application Priority Data

Mar. 17, 2020  (KR) .................. 10-2020-0032479

(51) Int. Cl.
| | |
|---|---|
| *B60R 21/2338* | (2011.01) |
| *B60R 21/207* | (2006.01) |
| *B60R 21/231* | (2011.01) |
| *B60R 21/00* | (2006.01) |

(52) U.S. Cl.
CPC ........ B60R 21/2338 (2013.01); B60R 21/207 (2013.01); B60R 21/23138 (2013.01); *B60R 2021/0044* (2013.01); *B60R 2021/0048* (2013.01); *B60R 2021/0055* (2013.01); *B60R 2021/23146* (2013.01); *B60R 2021/23386* (2013.01)

(58) Field of Classification Search
CPC .............. B60R 21/2338; B60R 21/207; B60R 21/23138; B60R 2021/0044; B60R 2021/0048; B60R 2021/0055; B60R 2021/23146; B60R 2021/23386
See application file for complete search history.

(56) References Cited

U.S. PATENT DOCUMENTS

| | | | |
|---|---|---|---|
| 8,360,469 B2 | 1/2013 | Wiik et al. | |
| 9,403,500 B2 | 8/2016 | Ishida et al. | |
| 9,663,061 B2 | 5/2017 | Mihm | |
| 10,000,177 B2 * | 6/2018 | Mihm | ................... B60R 21/262 |
| 10,023,147 B2 * | 7/2018 | Kwon | ............... B60R 21/23138 |
| 10,300,878 B2 * | 5/2019 | Park | .................... B60R 21/2171 |
| 10,543,801 B2 * | 1/2020 | Kwon | ................... B60R 21/233 |
| 10,814,824 B2 * | 10/2020 | Song | .................... B60R 21/233 |
| 10,974,686 B2 * | 4/2021 | Moon | ................... B60R 21/207 |
| 2015/0158453 A1 | 6/2015 | Fujiwara | |

(Continued)

FOREIGN PATENT DOCUMENTS

| | | |
|---|---|---|
| DE | 202017103033 U1 | 6/2017 |
| DE | 10 2017 008166 A1 | 4/2018 |

(Continued)

*Primary Examiner* — Karen Beck
(74) *Attorney, Agent, or Firm* — Fox Rothschild LLP

(57) ABSTRACT

A seat airbag for a vehicle is provided. The seat airbag is installed at a lateral side of a seat back to allow a cushion thereof to inflate forward. A front part of the cushion is divided into a head chamber disposed at an upper level, a chest chamber disposed at an intermediate level and a pelvis chamber disposed at a lower level. The airbag includes first to third tethers, which form a single cord connecting the chambers to one another, and are provided in the airbag to protect a passenger while surrounding the passenger.

16 Claims, 7 Drawing Sheets

(56) References Cited

U.S. PATENT DOCUMENTS

| | | | |
|---|---|---|---|
| 2015/0274110 A1 | 10/2015 | Ishida et al. | |
| 2015/0314748 A1 | 11/2015 | Mihm | |
| 2018/0118150 A1* | 5/2018 | Kwon | B60R 21/207 |
| 2018/0326938 A1 | 11/2018 | Rickenbach et al. | |
| 2019/0054890 A1* | 2/2019 | Kwon | B60R 21/233 |
| 2019/0061675 A1 | 2/2019 | Kwon | |
| 2019/0061676 A1* | 2/2019 | Kwon | B60R 21/233 |
| 2019/0283700 A1 | 9/2019 | Kwon | |
| 2020/0047705 A1* | 2/2020 | Moon | B60R 21/237 |
| 2021/0146874 A1* | 5/2021 | Lee | B60R 21/207 |

FOREIGN PATENT DOCUMENTS

| | | |
|---|---|---|
| DE | 202018004452 U1 | 10/2018 |
| DE | 10 2018 215098 A1 | 3/2019 |
| JP | 2014-128634 A | 7/2014 |
| JP | 2017-178147 A | 10/2017 |
| KR | 10-2018-0049404 A | 5/2018 |
| KR | 20190020254 A | 2/2019 |
| KR | 10-2019-0021905 A | 3/2019 |
| KR | 10-2019-0036178 A | 4/2019 |
| KR | 10-2019-0109812 A | 9/2019 |
| WO | WO-2020141737 A1 * | 7/2020 |

* cited by examiner

SEAT AIRBAG FOR VEHICLE

CROSS-REFERENCE TO RELATED APPLICATION

This application claims the priority benefit of Korean Patent Application No. 10-2020-0032479, filed on Mar. 17, 2020, the disclosure of which is incorporated herein by reference.

BACKGROUND

1. Field of the Disclosure

The present disclosure relates to a conceptual seat airbag for a vehicle provided in a vehicular seat to develop at a lateral side of a passenger and thus to simultaneously protect the head, chest and pelvis of the passenger.

2. Description of the Related Art

An autonomous vehicle is typically constructed with seats that freely swivel to enable passengers sitting in front seats and rear seats to face each other. Therefore, a conventional airbag which is designed to hold a passenger at a fixed position to protect the passenger from collision, may not fulfill its inherent functions in an autonomous vehicle.

Accordingly, there is a need to provide a seat with an airbag installed therein to sufficiently protect a passenger. Furthermore, it is necessary to reduce manufacturing costs by reducing the number of airbags, which have been installed at various locations in a conventional vehicle other than an autonomous vehicle, and it is necessary to more efficiently protect a passenger by directly holding a passenger at a seat itself.

Details described as the background art are intended merely for the purpose of promoting the understanding of the background of the present disclosure and should not be construed as an acknowledgment of the prior art that is previously known to those of ordinary skill in the art.

SUMMARY

Therefore, the present disclosure provides a seat airbag for a vehicle which is provided in a vehicular seat to develop at a lateral side of a passenger and thus to simultaneously protect the head, chest and pelvis of the passenger.

In accordance with the present disclosure, the above and other objects may be accomplished by the provision of a seat airbag for a vehicle, which is provided at a lateral side of a seat back to allow a cushion thereof to develop forwards and in which a front part of the cushion is divided into a head chamber disposed at an upper level, a chest chamber disposed at an intermediate level and a pelvis chamber disposed at a lower level, the seat airbag may include a first tether, which is secured at a first end thereof to the seat back and connected at a second end thereof to an upper portion of the chest chamber, a second tether, which is connected at a first end thereof to the second end of the first tether and extends downwards and which is connected at a second end thereof to a lower portion of the chest chamber, and a third tether, which is connected at a first end thereof to the second end of the second tether and extends rearwards and which secured at a second end thereof to an inflator.

The first to third tethers may be connected to one another to form a single cord. The second end of the first tether may extend through a first aperture formed in the upper portion of the chest chamber and the second end of the second tether may extend through a second aperture formed in the lower portion of the chest chamber. The first end of the first tether may be secured to a frame of the seat back.

The head chamber may include a head-dead zone, and the first tether may include a first portion of the first tether. The second end of the first tether may be secured to the head-dead zone, the first portion of the first tether may be secured at a first end thereof to the head-dead zone and may be connected at a second end thereof to the upper portion of the chest chamber, and the first end of the second tether may be connected to the second end of the first portion of the first tether.

The first portion of the first tether may be positioned between the cushion and a passenger, the second tether may be positioned outside the cushion, and the third tether may be positioned inside the cushion. The chest chamber may include a groove-shaped chest-dead zone formed in the upper portion thereof, which is narrowed toward a center of the chest chamber, such that the chest chamber is pulled by the first tether and a front part of the chest chamber is bent toward a chest of a passenger about the chest-dead zone when the airbag develops.

The head chamber may have a third aperture formed in a rear portion thereof. The first tether may extend through the third aperture and is bent and the second end of the first tether may be secured to the head-dead zone. The head chamber may have a first aperture formed in a rear portion thereof. The first tether may extend through the third aperture and be secured at the second end thereof to an upper portion of the head chamber. The first portion of the first tether may be secured at the first end thereof to the upper portion of the head chamber and connected at the second end thereof to the upper portion of the chest chamber, and the first end of the second tether may be connected to the second end of the first portion of the first tether.

The head chamber may include a projection formed at the upper portion thereof to project upwards. The second end of the first tether may be secured to a front portion of the projection, and the first end of the first portion of the first tether may be secured to the front portion of the projection. The second end of the first tether may be secured to an upper portion of the head chamber, the first portion of the first tether may be secured at the first end thereof to the upper portion of the head chamber and be connected at the second end thereof to the upper portion of the chest chamber, and the first end of the second tether may be connected to the second end of the first portion of the first tether.

The second tether may be connected at the first end thereof to the second end of the first portion of the first tether and may be connected at the second end thereof to a lower portion of the pelvis chamber, and the third tether may be connected at the first end thereof to the lower portion of the pelvis chamber and may be secured at the second end thereof to the inflator. The first portion of the first tether, the second tether and the third tether may be connected one another to form a single cord, which sequentially extends through a first aperture formed in the upper portion of the chest chamber, a second aperture formed in the lower portion of the chest chamber and a fourth aperture formed in the lower portion of the pelvis chamber.

The first tether may be positioned outside the cushion, the first portion of the first tether may be positioned inside the cushion, the second tether may be positioned outside the cushion, and the third tether may be positioned inside the cushion. All or a portion of the first to third tethers may be made of a stretchable material. A lower end of the head chamber and an upper end of the pelvis chamber may be connected to each other, and the chest chamber between the head chamber and the pelvis chamber may be bent toward a passenger.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
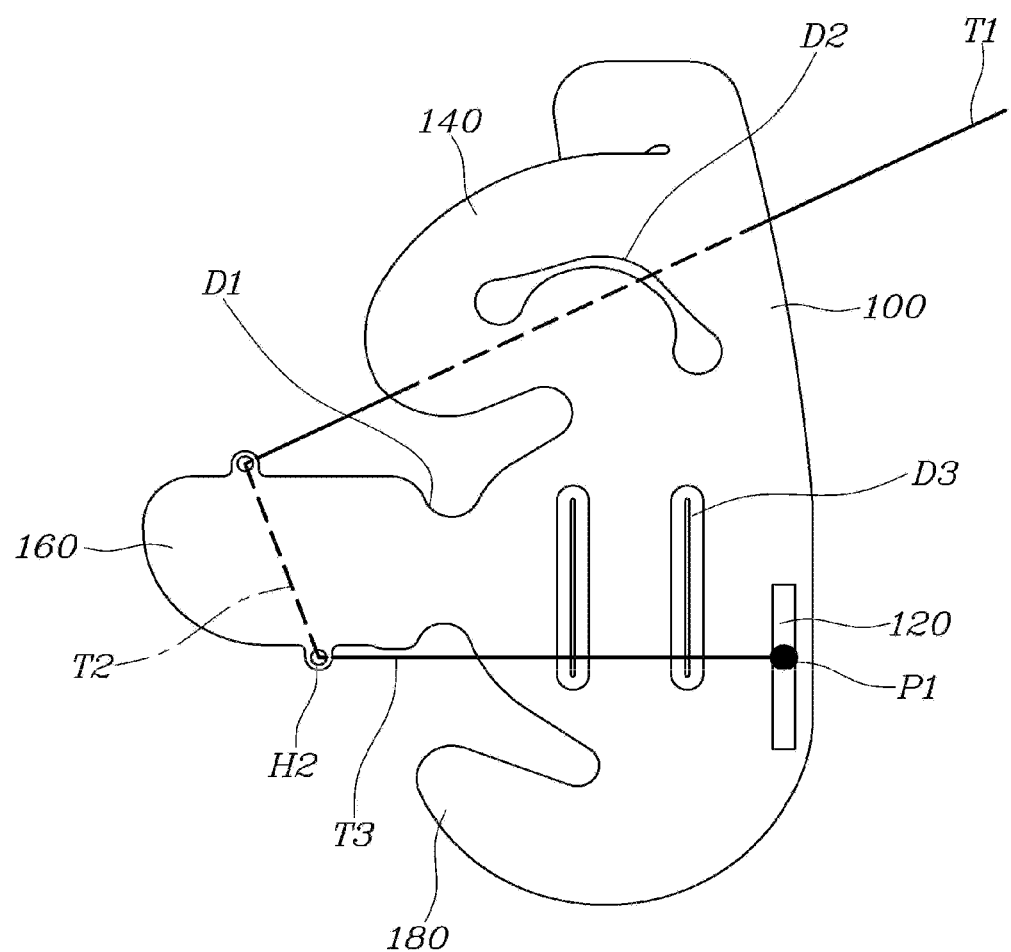
FIGS. 1 to 6 are views illustrating seat airbags for a vehicle according to various embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. Wherever possible, the same reference numbers will be used throughout the drawings to refer to the same or like parts.

FIGS. 1 to 6 are views illustrating seat airbags for a vehicle according to various exemplary embodiments of the present disclosure. FIG. 7 is a view illustrating the seat airbag for a vehicle shown in FIG. 6, which has developed.

The seat airbag for a vehicle according to an exemplary embodiment of the present disclosure may be mounted on a lateral side portion of a seat back (not shown), and may include a cushion 100, which develops (e.g., inflates) forward and may be divided at the front part thereof into a head chamber 140 disposed at an upper level, a chest chamber 160 disposed at an intermediate level and a pelvis chamber 180 disposed at a lower level. The seat airbag may include a first tether T1, secured at a first end thereof to the seat back and connected at a second end thereof to the upper portion of the chest chamber 160, a second tether T2, connected at a first end thereof to the second end of the first tether T1 and extends downwards and connected at a second end thereof to the lower portion of the chest chamber 160, and a third tether T3, connected at a first end thereof to the second end of the second tether T2 and extends rearwards and secured at a second end thereof to an inflator 120.

The seat airbag according to the exemplary embodiment of the present disclosure may be provided at the lateral side of the seat back. The seat airbag according to the exemplary embodiment of the present disclosure is efficient in an autonomous vehicle because the seat freely swivels, and is also efficient in a conventional typical vehicle because there is no need to mount a plurality of airbags to the vehicle. The seat airbag according to the exemplary embodiment of the present disclosure is more efficient for protection of a passenger because the seat airbag protects the passenger in the state of surrounding the passenger.

Specifically, the seat airbag according to the exemplary embodiment of the present disclosure may be installed at the frame of the seat back, and is constructed such that the cushion thereof develops or inflates forward from the lateral side of the seat back by virtue of the inflator 120. As illustrated in FIG. 1, although the cushion 100 has a single volume at the developing portion thereof, the front part thereof may be divided into the three chambers. In other words, the front part may be divided into the head chamber 140 disposed at the upper level, the chest chamber 160 disposed at the intermediate level and the pelvis chamber 180 disposed at the lower level.

The head chamber 140 protects the head of the passenger, the chest chamber 160 protects the chest of the passenger, and the pelvis chamber 180 protects the pelvis of the passenger. Particularly, the chest chamber 160 may be bent to surround the front surface of the chest of the passenger. The chest chamber 160 may be bent during development thereof although the chest chamber 160 develops or inflates forward. The chest chamber 160 may be bent toward the passenger when the chest chamber 160 develops forwards, as illustrated in FIG. 7.

Accordingly, the seat airbag according to the exemplary embodiment of the present is constructed such that the chest chamber 160 may be bent toward the chest of the passenger and the head chamber 140 and the pelvis chamber 180 may be bent to respectively support and hold the head and pelvis of the passenger at the lateral side of the seat back by virtue of a plurality of tethers and such that the force required to bend the chambers is provided through the tension of the tethers.

The actual lengths of the individual tethers must be shorter than those of the tethers illustrated in FIG. 1. When the shorter tethers are used, the individual chambers are deformed as illustrated in FIG. 7. The tethers are illustrated in FIGS. 1 to 6 as being longer than they really are for easy understanding. Specifically, in the exemplary embodiment shown in FIG. 1, since the first tether T1 is positioned outside the cushion beyond the passenger, the first tether T1 is not in direct contact with the passenger. Since the first tether T1 is connected at a first end thereof to a seat-back frame (not shown) at the lateral side of the seat back and connected at a second end thereof to the chest chamber 160, the first tether T1 may pull the chest chamber 160 toward the passenger when the cushion develops or inflates.

The second tether T2 may also be positioned outside the cushion. The second tether T2 may be connected at a first end thereof to the second end of the first tether T1 and connected at a second end thereof to the lower portion of the chest chamber 160 to support the chest chamber 160. The third tether T3 may be positioned between the cushion and the passenger. The third tether T3 may be connected at a first end thereof to the second end of the second tether T2 and connected at a second end thereof to the inflator 120. Consequently, the third tether T3 may support the pelvis of the passenger in the state of being in direct contact with the pelvis of the passenger.

With the connection relationships among the tethers, the head chamber 140, the chest chamber 160 and the pelvis chamber 180 are gathered without spreading, as illustrated in FIG. 7. Particularly, the chest chamber 160 may be shaped to be bent toward the chest of the passenger. By virtue of the deformed shapes and supporting force of the chambers, the passenger may be held in the state of sitting in the seat to prevent the passenger from springing forward, and external impact may be absorbed by the cushion. The first to third tethers T1 to T3 may be configured to have a single cord shape. The second end of the first tether T1 may extend through a first aperture H1 formed in the upper portion of the chest chamber 160, and the second end of the second tether T2 may extend through the second aperture H2 formed in the lower portion of the chest chamber 160. The first end of the first tether T1 may be secured to the seat-back frame (not shown).

Figure 2:
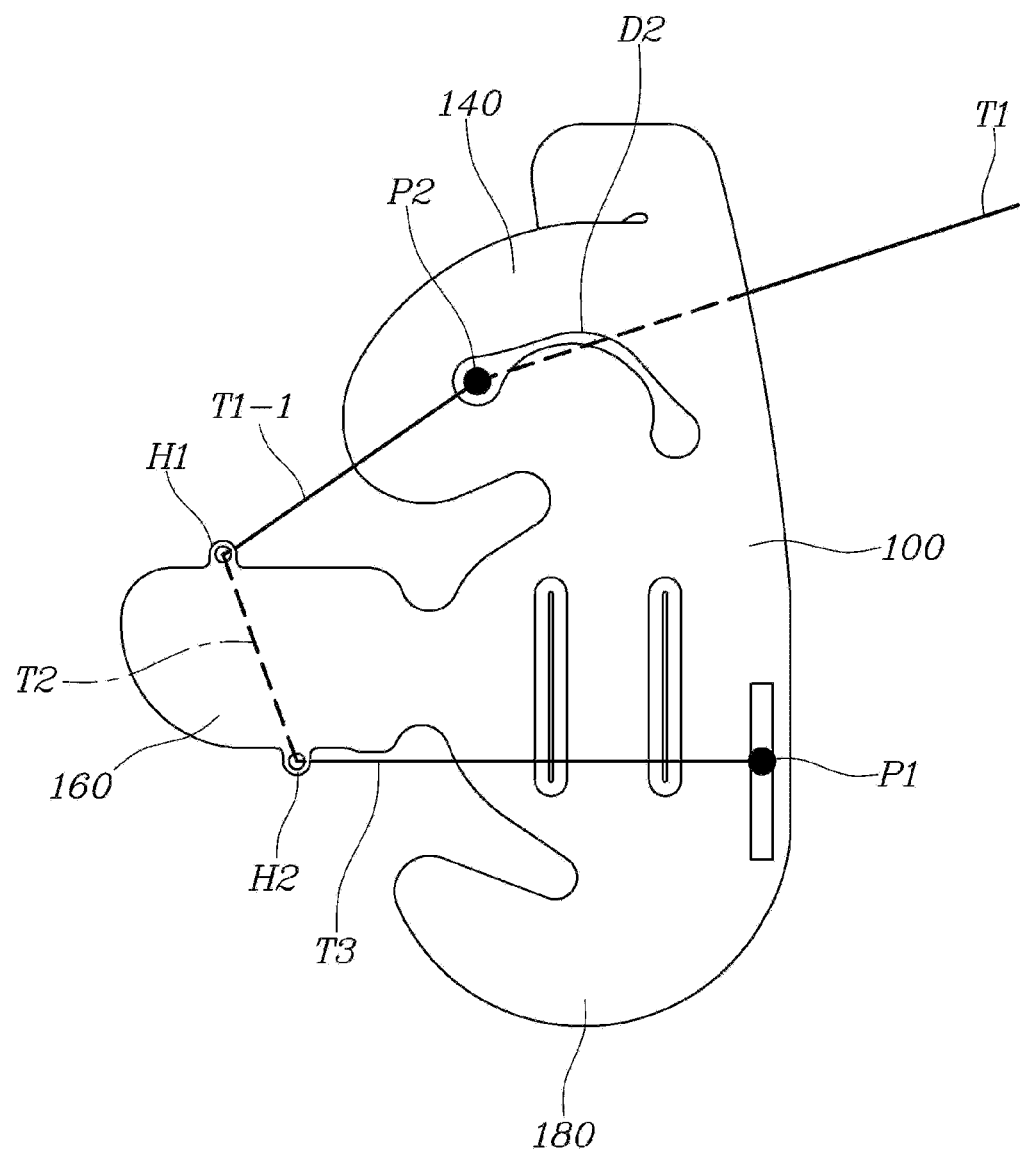

As illustrated in FIG. 2, the head chamber 140 may include therein a head-dead zone D2, and the second end of the first tether T1 may be secured to the head-dead zone D2. The first portion of the first tether T1-1 may be secured at a first end thereof to the head-dead zone D2 and may be connected at a second end thereof to the upper portion of the chest chamber 160. The first end of the second tether T2 may be connected to the second end of the first portion of the first tether T1-1. In particular, the first portion of the first tether T1-1 may be positioned between the cushion and the passenger, the second tether T2 may be positioned outside the cushion, and the third tether T3 may be positioned inside the cushion.

With the connection relationships of the tethers, the tethers share the tension thereof and affect one another. Accordingly, when the passenger is loaded to one side, the tether at the opposite side is pulled, thereby efficiently holding the passenger. The chest chamber 160 may include, in the upper portion thereof, a chest-dead zone D1, which has a groove shape that is narrowed toward the center of the chest chamber 160. Consequently, when the seat airbag develops or inflates, the chest chamber 160 may be pulled by the first tether T1, and the front part of the chest chamber 160 may be bent toward the chest of the passenger about the chest-dead zone D1. By virtue of the deformation of the chest chamber 160, the chest chamber 160 is capable of efficiently holding the passenger.

Figure 3:
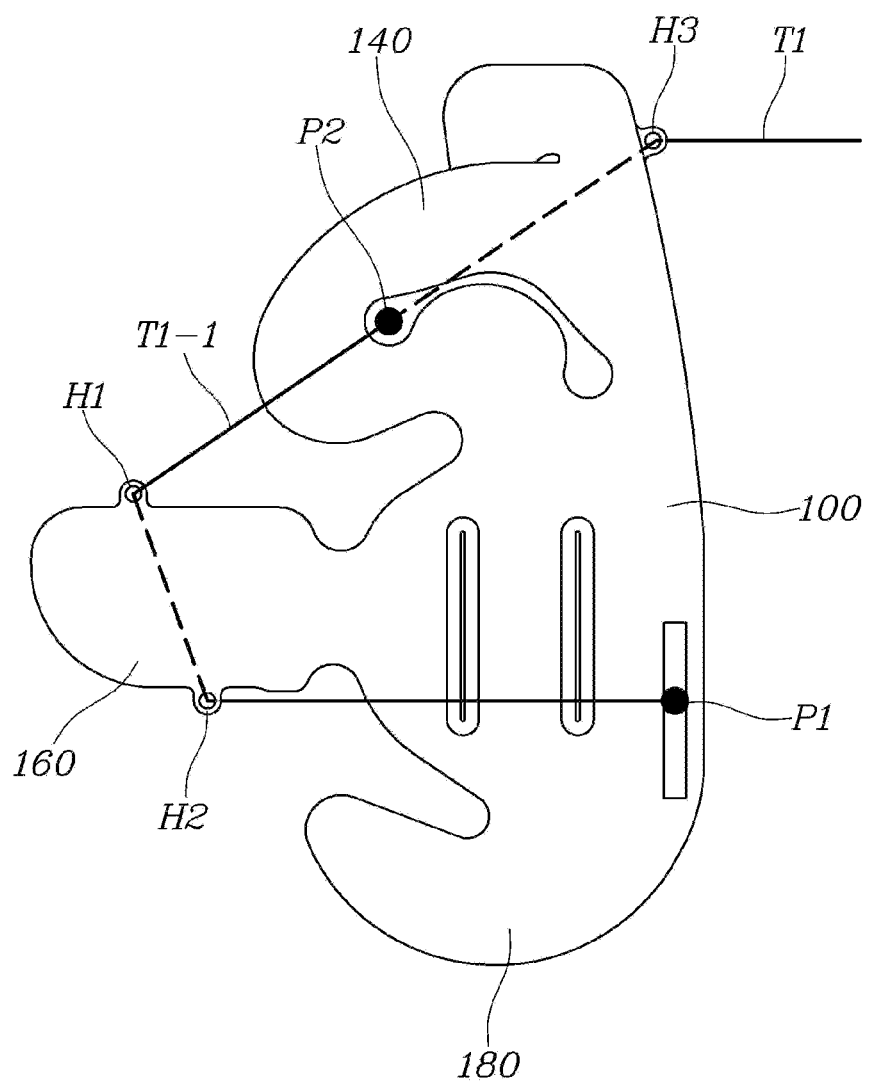

As illustrated in FIG. 3, the head chamber 140 may include, in the rear portion thereof, a third aperture H3. The first tether T1 may extend through the third aperture H3 and may then be bent, and the second end of the first tether T1 may be secured to the head dead zone D2.

Figure 4:
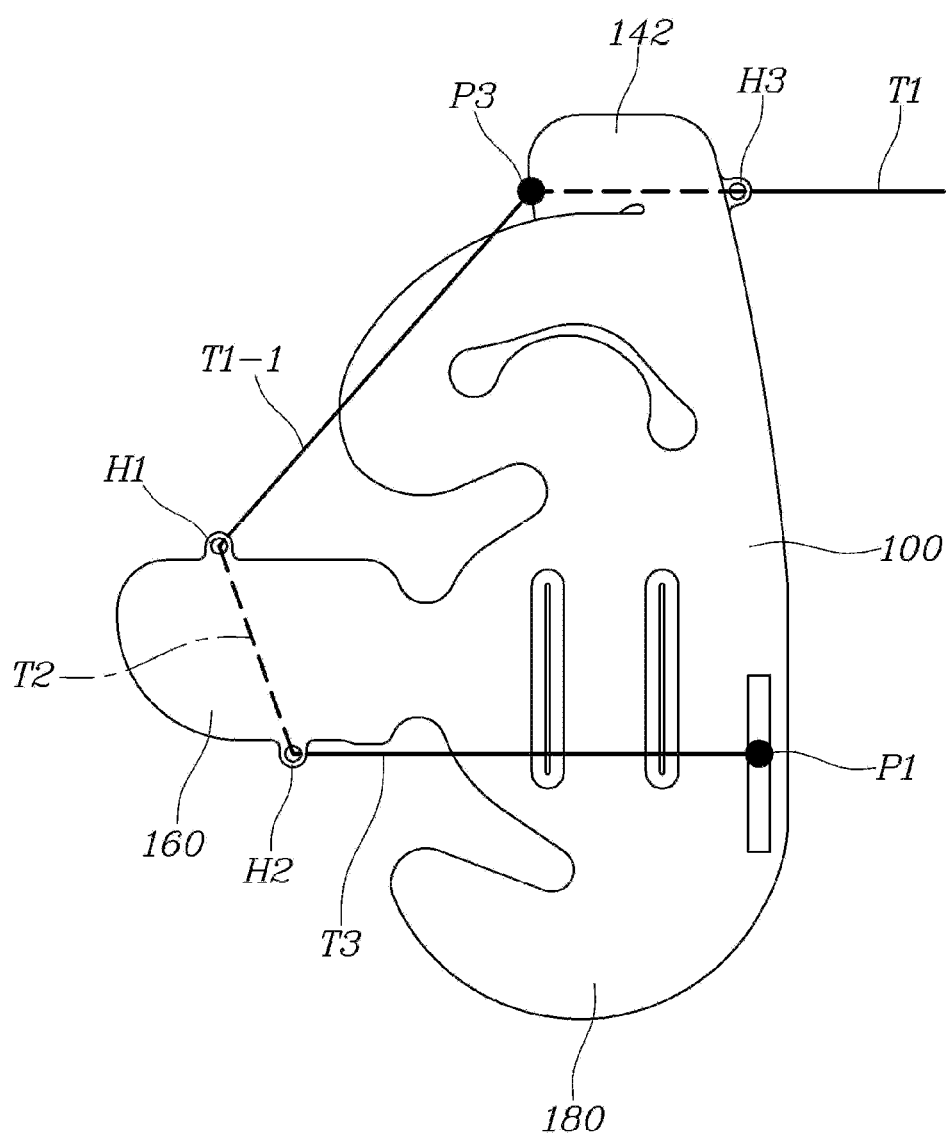

As illustrated in FIG. 4, the head chamber 140 may be include, in the rear portion thereof, the third aperture H3. The first tether T1 may extend through the third aperture H3, and the second end of the first tether T1 may be secured to the upper portion of the head chamber 140. The first portion of the first tether T1-1 may be secured at the first end thereof to the upper portion of the head chamber 140 and may be connected at the second end thereof to the upper portion of the chest chamber 160. The first end of the second tether T2 may be connected to the second end of the first portion of the first tether T1-1.

When the first portion of the first tether T1-1, the second tether T2 and the third tether T3 are connected to one another to form a single cord, the tether may pull the upper fixing point P3 of the head chamber 140. Consequently, it may be possible to prevent shaking of the head chamber 140 and to reliably pull the chest chamber 160 toward the passenger, and it may be possible to increase the speed in which the chest chamber 160 is initially pulled.

Figure 5:
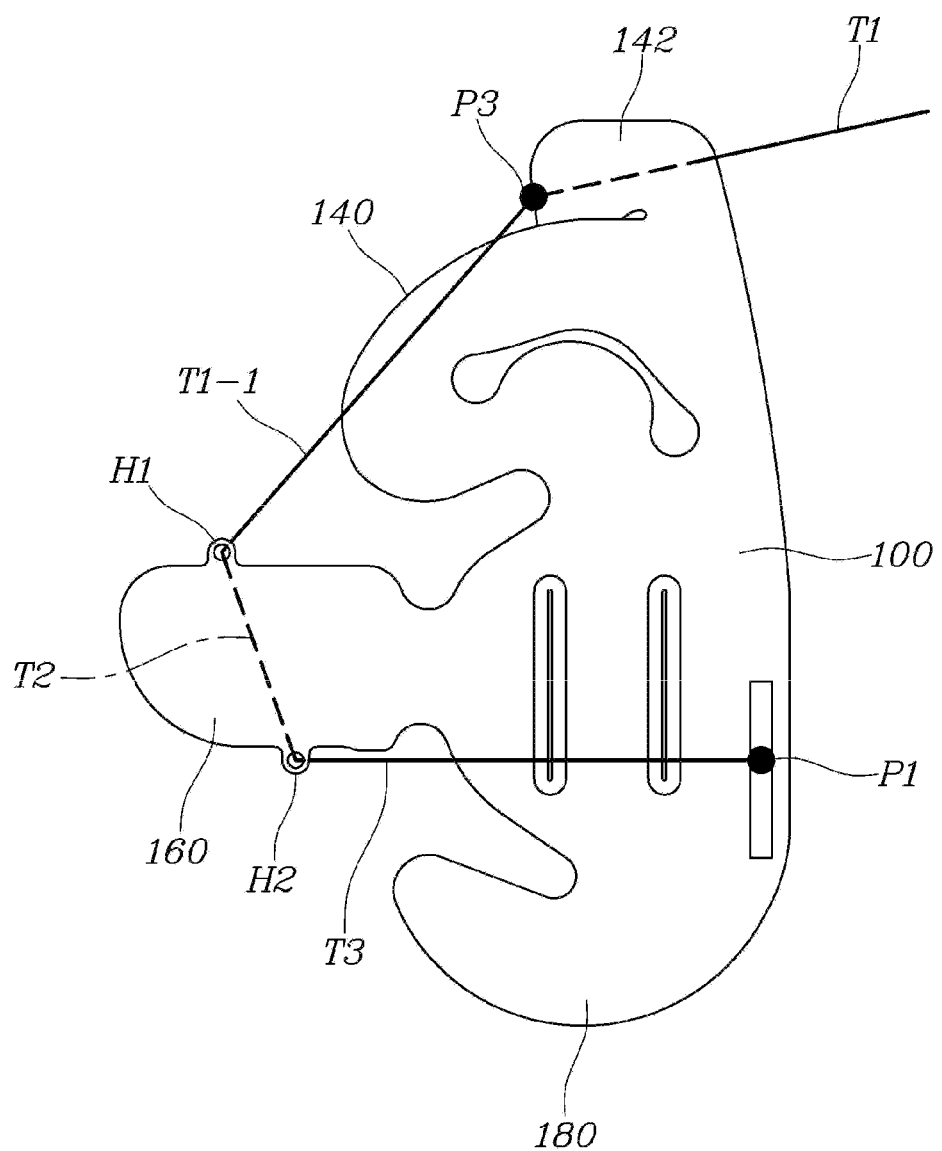

As illustrated in FIG. 5, the head chamber 140 may include, at the upper portion thereof, a projection 142, which projects upwards. The second end of the first tether T1 may be secured to the front portion of the projection 142, and the first end of the first portion of the first tether T1-1 may be secured to the front portion of the projection 142. In other words, the second end of the first tether T1 may be secured to the upper portion of the head chamber 140, and the first portion of the first tether T1-1 may be secured at the first end thereof to the upper portion of the head chamber 140 and may be connected at the second end thereof to the upper portion of the chest chamber 160. The first end of the second tether T2 may be connected to the second end of the first portion of the first tether T1-1.

Figure 6:
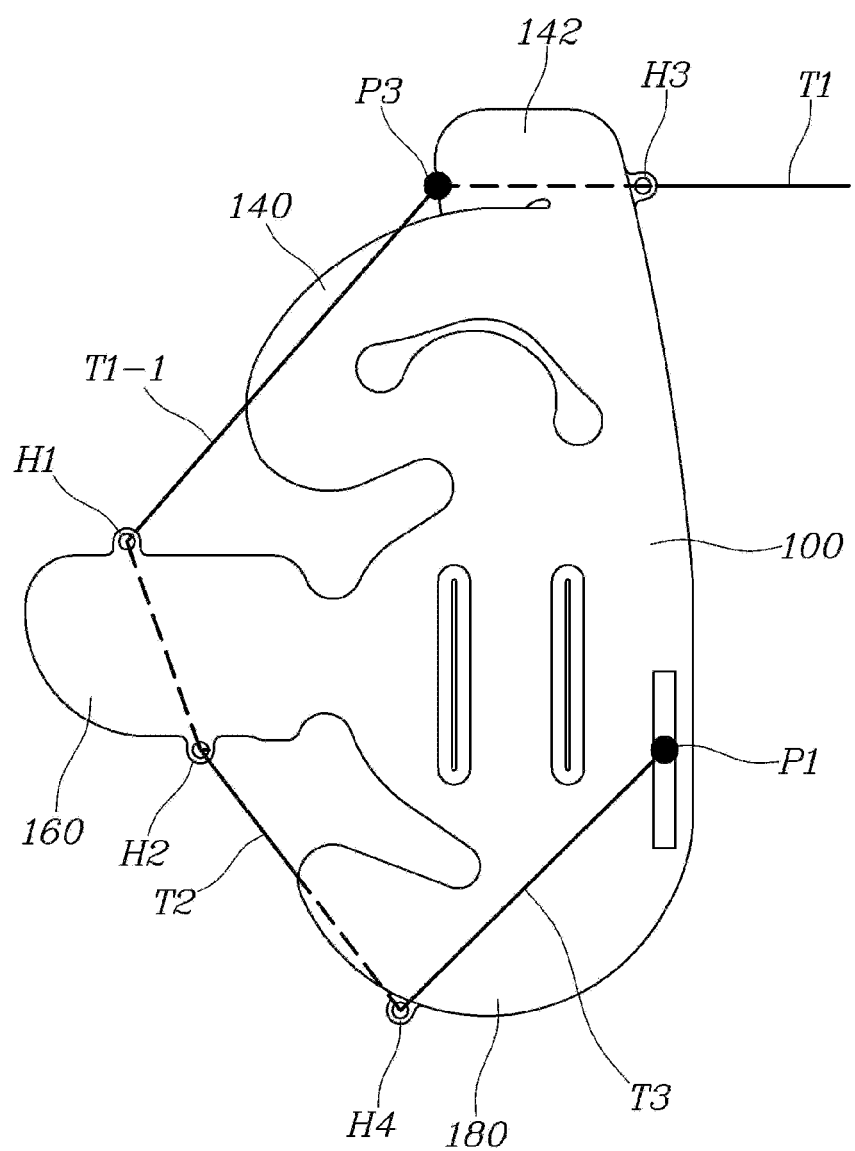
Figure 7:
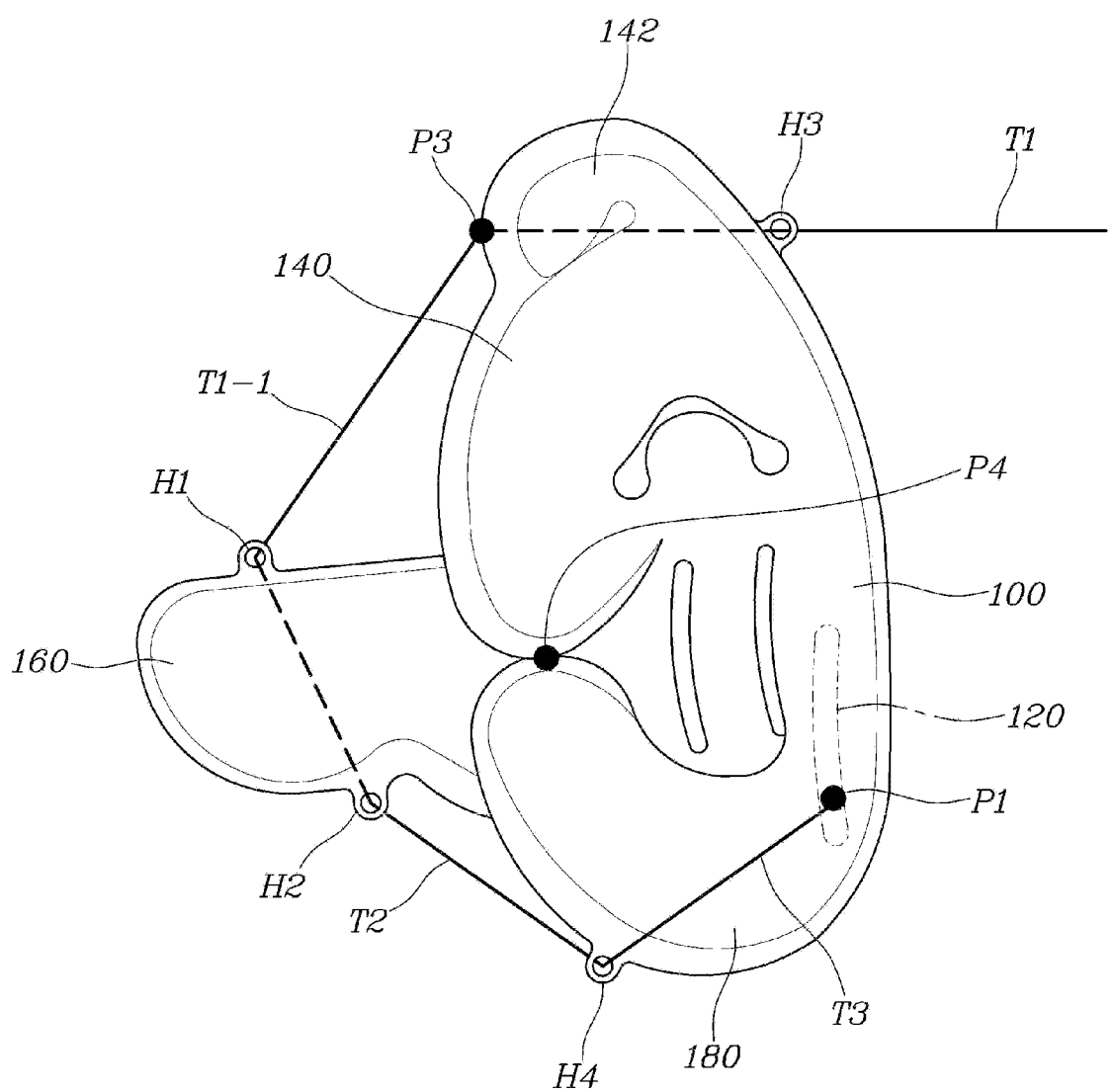
FIG. 7 is a view illustrating the seat airbag for a vehicle shown in FIG. 6, which has developed.

As illustrated in FIG. 6, the second tether T2 may be connected at the first end thereof to the second end of the first portion of the first tether T1-1 and at the second end thereof to the lower portion of the pelvis chamber 180. The third tether T3 may be connected at the first end thereof to the lower portion of the pelvis chamber 180, and may be secured at the second end thereof to the inflator 120. In particular, the first portion of the first tether T1-1, the second tether T2 and the third tether T3 may be connected to one another to form a single cord, which sequentially extends through the first aperture H1 formed in the upper portion of the chest chamber 160, the second aperture H2 formed in the lower portion of the chest chamber 160 and the fourth aperture H4 formed in the lower portion of the pelvis chamber 180.

Consequently, the first tether T1 may be positioned outside the cushion, and the first portion of the first tether T1-1 may be positioned inside the cushion. Furthermore, the second tether T2 may be positioned outside the cushion, and the third tether T3 may be positioned inside the cushion. All or a portion of the first to third tethers T1 to T3 may be made of a stretchable material. In other words, although all of the tethers may be made of a stretchable material such as rubber or silicone, only a portion of the tethers may be made of the stretchable material. In the case of employing the stretchable material, since the tethers are brought into close contact with the passenger while contracting after the completion of development, it may be possible to protect the passenger in the state of surrounding the passenger. By virtue of the above-described structure, since the seat airbag surrounds the wider areas of the chest and head of the passenger, it may be possible to decrease shaking of the head and chest of the passenger and to efficiently hold the passenger.

As illustrated in FIG. 7, the seat airbag according to an exemplary embodiment of the present disclosure may be constructed such that the lower end of the head chamber 140 is connected to the upper end of the pelvis chamber 180. The chest chamber 160, which is positioned between the head chamber 140 and the pelvis chamber 180, may be bent toward the passenger. The connecting portions of the head chamber 140 and the pelvis chamber 180 may be connected to each other through sewing in the manufacturing process. Consequently, the connection between the head chamber 140 and the pelvis chamber 180 efficiently holds the body of the passenger in the event of collision, thereby minimizing the movement of the passenger. Since the shape of the chambers shown in FIG. 7 may be applied to all of the exemplary embodiments, the other embodiments are not limited to the shapes illustrated in the corresponding views.

As is apparent from the above description, since the seat airbag for a vehicle according to the present disclosure is provided in a vehicular seat to develop at a lateral side of a passenger and thus to simultaneously protect the head, chest and pelvis of the passenger, it may be possible to provide a novel conceptual seat airbag for a vehicle, which is different from conventional side airbags.

Although the exemplary embodiments of the present disclosure have been described above with reference to the accompanying drawings, those skilled in the art will appreciate that the present disclosure may be implemented in various other embodiments without changing the technical ideas or features thereof.

What is claimed is:

1. A seat airbag for a vehicle, which is provided at a lateral side of a seat back to allow a cushion thereof to inflate forward and in which a front part of the cushion is divided into a head chamber disposed at an upper level, a chest chamber disposed at an intermediate level and a pelvis chamber disposed at a lower level, the seat airbag comprising:
   a first tether secured at a first end thereof to the seat back and a second end of the first tether extended toward the head chamber;
   a second tether connected at a first end thereof to the second end of the first tether and extending downwards and connected at a second end thereof to a lower portion of the chest chamber; and
   a third tether connected at a first end thereof to the second end of the second tether and extending rearwards and secured at a second end thereof to an inflator:
   wherein the first tether includes a first portion of the first tether, wherein the second end of the first tether is secured to the head chamber, the first portion of the first tether is secured at a first end thereof to the head chamber and is connected at a second end thereof to the upper portion of the chest chamber, and the first end of the second tether is connected to the second end of the first portion of the first tether.

2. The seat airbag for a vehicle according to claim 1, wherein the first to third tethers are connected to one another to form a single cord, and wherein the second end of the first tether extends through a first aperture formed in the upper portion of the chest chamber, and the second end of the second tether extends through a second aperture formed in the lower portion of the chest chamber.

3. The seat airbag for a vehicle according to claim 1, wherein the first end of the first tether is secured to a frame of the seat back.

4. The seat airbag for a vehicle according to claim 1, wherein the head chamber includes a head-dead zone, wherein the second end of the first tether is secured to the head-dead zone, and the first portion of the first tether is secured at a first end thereof to the head-dead zone.

5. The seat airbag for a vehicle according to claim 4, wherein the first portion of the first tether is positioned between the cushion and a passenger, the second tether is positioned outside the cushion, and the third tether is positioned inside the cushion.

6. The seat airbag for a vehicle according to claim 1, wherein the chest chamber includes a groove-shaped chest-dead zone formed in the upper portion thereof, which is narrowed toward a center of the chest chamber and the chest chamber is pulled by the first tether and a front part of the chest chamber is bent toward a chest of a passenger about the chest-dead zone when the airbag inflates.

7. The seat airbag for a vehicle according to claim 4, wherein the head chamber includes a third aperture formed in a rear portion thereof, and wherein the first tether extends through the third aperture and is bent, the second end of the first tether being secured to the head-dead zone.

8. The seat airbag for a vehicle according to claim 4, wherein the head chamber includes a first aperture formed in a rear portion thereof, wherein the first tether extends through the third aperture and is secured at the second end thereof to an upper portion of the head chamber, wherein the first portion of the first tether is secured at the first end thereof to the upper portion of the head chamber and is connected at the second end thereof to the upper portion of the chest chamber, and the first end of the second tether is connected to the second end of the first portion of the first tether.

9. The seat airbag for a vehicle according to claim 8, wherein the head chamber includes a projection formed at the upper portion thereof to project upwards, and wherein the second end of the first tether is secured to a front portion of the projection, and the first end of the first portion of the first tether is secured to the front portion of the projection.

10. The seat airbag for a vehicle according to claim 4, wherein the second end of the first tether is secured to an upper portion of the head chamber, wherein the first portion of the first tether is secured at the first end thereof to the upper portion of the head chamber and is connected at the second end thereof to the upper portion of the chest chamber, and wherein the first end of the second tether is connected to the second end of the first portion of the first tether.

11. The seat airbag for a vehicle according to claim 8, wherein the second tether is connected at the first end thereof to the second end of the first portion of the first tether and is connected at the second end thereof to a lower portion of the pelvis chamber, and wherein the third tether is connected at the first end thereof to the lower portion of the pelvis chamber and is secured at the second end thereof to the inflator.

12. The seat airbag for a vehicle according to claim 11, wherein the first portion of the first tether, the second tether and the third tether are connected to one another to form a single cord, which sequentially extends through a first aperture formed in the upper portion of the chest chamber, a second aperture formed in the lower portion of the chest chamber and a fourth aperture formed in the lower portion of the pelvis chamber.

13. The seat airbag for a vehicle according to claim 11, wherein the first tether is positioned outside the cushion, and the first portion of the first tether is positioned inside the cushion, and wherein the second tether is positioned outside the cushion, and the third tether is positioned inside the cushion.

14. The seat airbag for a vehicle according to claim 1, wherein all or a portion of the first to third tethers is made of a stretchable material.

15. The seat airbag for a vehicle according to claim 1, wherein a lower end of the head chamber and an upper end of the pelvis chamber are connected to each other, and the chest chamber between the head chamber and the pelvis chamber is bent toward a passenger.

16. A seat airbag for a vehicle, which is provided at a lateral side of a seat back to allow a cushion thereof to inflate forward and in which a front part of the cushion is divided into a head chamber disposed at an upper level, a chest chamber disposed at an intermediate level and a pelvis chamber disposed at a lower level, the seat airbag comprising:
- a first tether secured at a first end thereof to the seat back and a second end of the first tether extended toward the head chamber;
- a second tether connected at a first end thereof to the second end of the first tether and extending downwards and connected at a second end thereof to a lower portion of the chest chamber; and
- a third tether connected at a first end thereof to the second end of the second tether and extending rearwards and secured at a second end thereof to an inflatorwherein the chest chamber is configured to be pulled by the first tether such that a front part of the chest chamber is bent toward a chest of a passenger when the airbag inflates.

* * * * *